May 23, 1961 E. A. VOLK, JR 2,984,976
CONTROL FOR CARTRIDGE STARTER
Filed Oct. 28, 1957
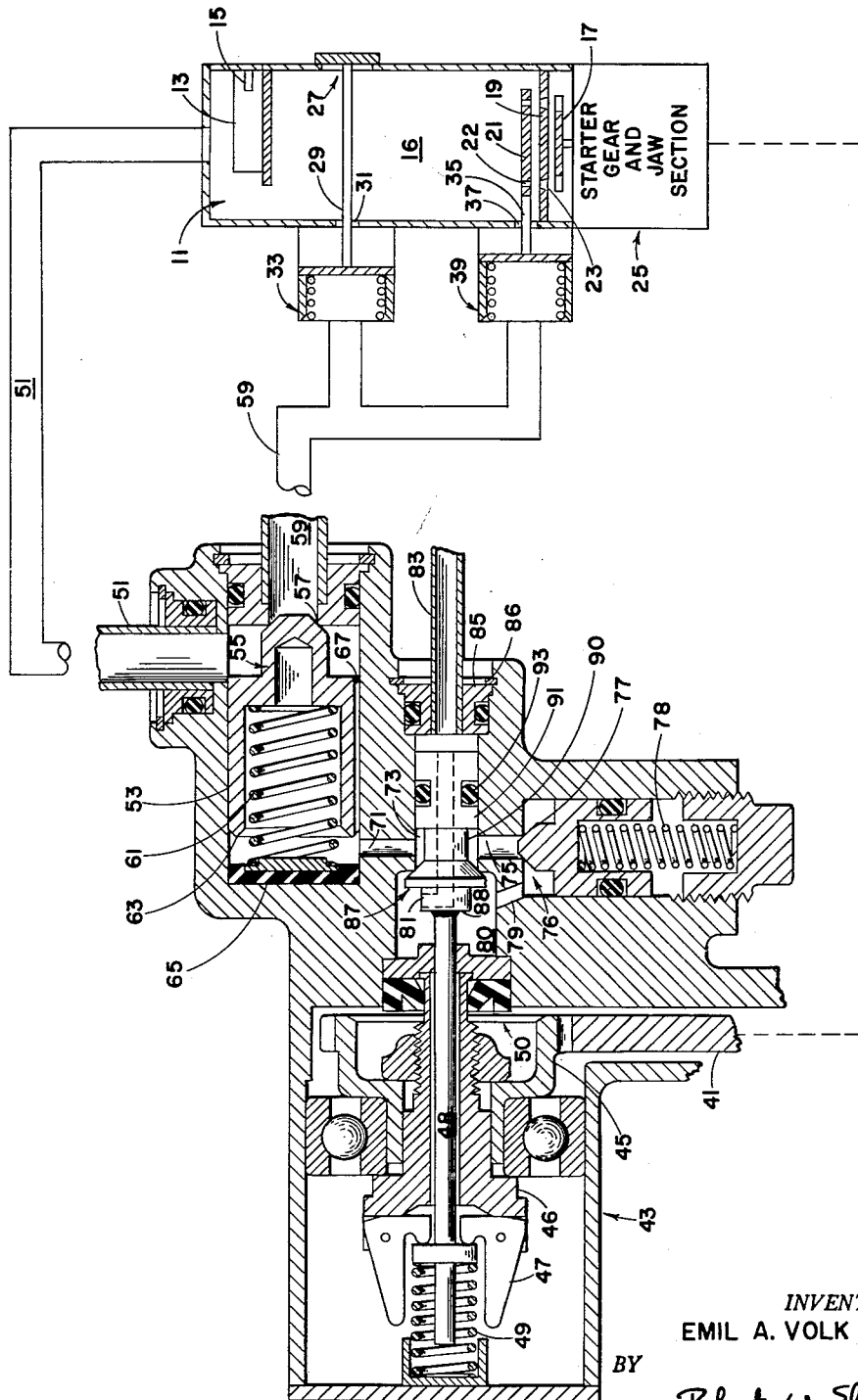
INVENTOR.
EMIL A. VOLK JR.
BY
Robert W. Ely
ATTORNEY

United States Patent Office 2,984,976
Patented May 23, 1961

2,984,976

CONTROL FOR CARTRIDGE STARTER

Emil A. Volk, Jr., Hasbrouck Heights, N.J., assignor to The Bendix Corporation, a corporation of Delaware Filed Oct. 28, 1957, Ser. No. 692,662

7 Claims. (Cl. 60—39.14)

The present invention relates to turbine starters for aircraft turbine engines and more particularly concerns such a starter in which a solid propellant cartridge provides gases for driving the starter turbine.

Solid propellant starters require means to cut off or block the supply of gas to the turbine when starting speed is reached and also means to release gases if the pressure exceeds a predetermined safe level. A starter of this type is disclosed in my co-pending U.S. patent application Serial No. 665,243, filed June 12, 1957. This starter has a pneumatic system for operating a dump valve and a turbine nozzle cut-off plate. The starter disclosed in this co-pending application requires direct current electrical power to operate the speed responsive control. In some aircraft, this type of electrical power is not available. Further, when electrical power is used to operate such a system, a holding relay in the starter controls is provided in order to give a time delay to permit the solid propellant cartridge to burn out.

An object of the present invention is to provide an improved solid propellant starter having combination speed sensitive and pressure sensitive means for diverting gases from the starter turbine which means does not require electrical power.

A further object is to provide in such a starter an improved pneumatic system for operating a nozzle cut-off plate and a dump valve in which a speed responsive control valve is mechanically connected to the starter power train.

Another object is the provision in a cartridge starter of a pneumatic control system which permits the solid propellant cartridge to burn out after excess speed or after excess pressure.

An additional object is the provision of a solid propellant starter having a pneumatic control system in which a compact structure provides a speed responsive valve, a pressure responsive valve and a piston-cylinder control valve which provides a time delay.

A further object is to provide a solid propellant turbine starter in which a single normally-closed control valve for pneumatic-operated diverting means is responsive to a predetermined turbine speed or a predetermined gas pressure.

The accomplishment of the foregoing objects, along with the features and advantages of the present invention, will be apparent from the following detailed description and the accompanying drawing which schematically shows a starter in operating stage and shows a cross section of the pneumatic control means.

Referring to the drawing, it can be seen that the schematic starter includes the gas generating breech or chamber 11 having an ammonium nitrate solid propellant cartridge 13 and an igniter 15 therefor. The gas generating means provides gases through passage 16 for driving the turbine 17 having blades. The gases pass through the nozzles of a turbine nozzle member 19 when the nozzle cut-off plate 21 has its annular ring of holes 22 aligned with the ring of nozzle openings 23 in the turbine nozzle member 19. Such a nozzle cut-off plate is described in the Volk U.S. Patent No. 2,651,493. The turbine 17 having blades or buckets is connected by its shaft to a conventional starter gearing and jaw means 25 for driving an aircraft engine (not shown) to starting speed. The gear-jaw section 25 conventionally is comprised of reduction gearing and jaw engaging means which adapts the starter for transmitting the power of the turbine 17 to an aircraft turbine engine.

The starter has a dump valve 27 which is arranged to be closed by gases when the normally slow-burning cartridge 13 is ignited by igniter 15. The dump valve 27 is urged to closed position as shown because gases pass through the annular opening formed by the rod 29 and the port 31 in the side of the gas passage 16. The gases, passing through this opening, urge the spring-biased piston 33 to the left (as seen in the drawing) and hence cause closing of dump valve 27.

The turbine nozzle cut-off plate 22 is urged into alignment by the gases which flow through the annular opening formed by the rod 35 and the port 37 in the side of the gas passage 16. As with the dump valve, a spring-biased piston 39 is urged to the left when gases are generated and moves the nozzle cut-off plate 21 into alignment. Piston 39 and piston 33 are both adapted to be moved to the left when a relatively low pressure of generated gases exists because the springs biasing these pistons are only of such strength as to move the pistons to the right when the pressure forces on each side of the piston are balanced or equal. This low pressure of the generated gases exerts sufficient force to compress the gas trapped behind pistons 33 and 39 in conduit 59 by valve 55. As will be explained conduit 59 is vented at the end of a firing cycle to conduit 51 by the opening of valve 55 and before firing there would be leakage around pistons 33 and 39 to passage 16 which is vented by valve 27.

From the foregoing description concerning the schematic showing of the starter with its pneumatic means for putting the dump valve in closed position and the turbine nozzle cut-off plate in alignment, it is apparent that operative positioning of the starter dump valve 27 and the cut-off plate 21 occurs as soon as the cartridge 15 is ignited. Since the cartridge normally generates gas in excess of the amount required for obtaining starting speed, the speed responsive control of the present invention is provided for putting the starter into non-operative stage. This control also provides for complete burn-out of the cartridge. This control for the pneumatic means for operating the dump valve and nozzle cut-off plate also provides for the possibility of a defective cartridge generating excessive unsafe pressure. This control is obtained by a compact unitary control device and the control device will now be described with reference to the cross-section at the left on the drawing.

The pneumatic control device is actually mounted on section 25 of the starter and is connected to the gear-jaw section 25 of the starter by a gear 41. This mechanical connection is shown by a dashed line which runs from gear 41 to the axis of section 25 of the starter. With this connection, the gear 41 is arranged to actuate a conventional governor 43 by rotating governor gear 45 which is suitably connected at the left to the annular part of bracket 46. The governor 43 has centrifugally-actuated arms 47 which are pivoted to arms of bracket 46 and move a rod 48 by its collar axially to the left against a spring 49. This action will open a speed responsive valve which will be described hereinafter. Rod 48 is suitably mounted in sealed bearing 50 for axial movement. It is to be noted that arms 47 pivot into abutment with bracket 46 so that only limited movement of rod 48 occurs.

The gas generator 11 is connected by conduit 51 to the upper right end of the control device and this conduit 51 opens into cylindrical chamber 53 which has a piston valve 55 therein. This piston valve 55 has a beveled head thereon which seats against the port 57 of passage 59 upon valve 55 sliding to the right in chamber 53. A spring 61 biases valve 55 to closed position. As will be described, starting speed or excess pressure causes valve 55 to open. Opening of valve 55 permits gas to flow via passage 59 to pistons 33, 39 so that the dump valve 27 is opened and the nozzle cut-off plate 21 is moved out of alignment.

The inner beveled edge 63 of the piston of valve 55 engages a rubber sealing gasket 65 when the valve 55 is urged to the left. A narrow passage 67 (enlarged for clarity) is provided in the piston of valve 55 so that the pressure of gases can be applied to the left side of the piston valve 55. In actual practice, leakage of gas past the walls of the valve piston which is not sealed with respect to the cylinder chamber 53 would be equivalent to narrow passage 67 and would also function, when valve 55 is closed, to permit gases to exert a force tending to close valve 55.

It is to be noted that, when the space back of piston valve 55 is vented due to speed or pressure, pressurized gas on the front of the piston valve will cause this valve to fly open and move to the left so that its beveled edge 63 will seal tightly against gasket 65. The gasket 65 prevents pressure building up behind the valve piston and the valve 55 remains open until the generated gas pressure drops to a predetermined low level when the cartridge is burned out completely. The chambers behind pistons 33 and 39 are vented to this low pressure since valve 55 is open. At this low pressure level, spring 61 is able to close valve 55. This feature providing complete burn-out of the cartridge 13 is very significant since the starter is not reactivated by the premature reclosing of valve 55 once the controls have diverted the motive power or gases from the starter turbine.

The means for venting the back of closed valve 55 includes a speed responsive valve 87 connected to the governor rod 48, a pressure responsive poppet valve 76 opposite the inner part of chamber 53 and interconnected passages and chambers which permit a compact structure. Extending from the inner part of the cylinder chamber 53 there is a passage 71 which opens into a reduced bore 73. Opposite passage 71 there is another passage 75 which has its outlet closed by the pressure responsive piston valve 76. Valve 76 is comprised of a piston having a beveled head 77 which abuts the outlet of passage 75. An adjustable spring 78 biases the valve 76 to closed position and is adjusted so that a predetermined unsafe pressure must be developed by the cartridge 13 and transmitted through passage 51, chamber 53, passage 71 and passage 75 before valve 76 will open. When valve 76 opens, it vents through passage 79 in the housing, chamber or bore 80 which is to the right from bearing 50 and vent passage 81 which is indicated by dashed lines in parts forming the speed responsive valve 87. Gas in passage 81 passes through the right end of bore 73 and tube 83 which opens to atmosphere. Vent tube 83 is positioned in communication with chamber 73 by means of an O-ringed collar 85 and a lock washer 86.

Venting by the opened, speed-responsive valve 87 which normally closes the right end of chamber 73 from chamber 80 also is by passage 81. It is to be noted that chamber 73 has a smaller diameter than cylindrical bore 80 and the edge of the shoulder between them provides the seat of speed responsive valve 87. Speed responsive valve 87 has a beveled face which seats on the shoulder between chamber 73 and 80. The face part of speed responsive valve 87 is connected to the governor 43 by means of a cylindrical valve head 88 which is welded to rod 48. It is to be noted that the vent passage 81 extends in valve head 88 perpendicular to the axis of the rod 48 and then along a projected axis thereof through the valve member, a reduced cylindrical part 90 and an enlarged cylindrical part 91 which seals against the sidewall of chamber 73. Cylindrical part 90 provides an annular passage in the left part of chamber 73 for passing gas to speed responsive valve 87 and via passage 75 to pressure responsive valve 76. It is to be noted that the above-noted limited movement of rod 48 prevents the larger cylindrical part 91 from blocking off passages 71 or 75. The larger cylindrical part 91 serves as guide for valve 87 and prevents escape of gas to vent 83 by means of its seal 93. From the foregoing, it is evident that the back of pneumatic control valve 55 is vented by the opening of speed responsive valve 87 or pressure responsive valve 76 to effect opening of valve 55 and permit gases to flow to the backs of pistons 33 and 39.

In operation, the cartridge 13 is ignited and the generated gases by acting on pistons 33 and 39 close dump valve 27 and align the nozzle cut-off plate 21 so that the generated gases can drive the turbine 17. The generated gases also pass through conduit 51 to the control device. From the bottom of chamber 53, the gases pass through restricted passage 67 to back of the piston of valve 55. In this manner, valve 55 is retained in closed position and the pneumatic operating means for the dump valve 27 and nozzle cut-off plate are not affected. In normal operation, valve 55 will remain closed until the starter reaches starting speed when gear 41 will actuate the governor 43 so that the valve member of speed responsive valve 87 is lifted from its valve seat. When this occurs, the space behind the valve 55 will be vented via passage 81 to atmosphere and the valve 55 will be opened and rapidly urged into engagement with seal 65 so that communication between the gas generator 11 and the back of the dump valve piston 33 and the back of the nozzle cut-off plate piston 39 is established. This will provide a balancing of the pressures on the pistons 33 and 39 and their respective springs will open the dump valve 27 and move the nozzle cut-off plate 21 out of alignment to divert the gases from the turbine by a large-flow exhaust and nozzle blocking. As above mentioned, it is to be noted that the centrifugal arms 47 of the governor are limited in their pivoting so that the cylindrical member 91 does not obstruct passage 71 or 75. With this construction, it is apparent that the space back of valve 55 will be rapidly vented without interference and further that malfunctioning of the governor will not render the pressure responsive valve 76 inoperative.

In the event that an excessive and unsafe pressure is generated by the cartridge 13, as some times occurs due to cracks or other faults, the effect of the unsafe pressure will be transmitted from back of valve 55 through passages 71 and 75 to the pressure responsive valve 76 which will then open. The opening of valve 76 will reduce the pressure back of valve 55 by venting through passages 79, 80 and 81 so that valve 55 opens and permits gases to operate a dump valve 27 to open position and to move the nozzle plate 21 out of alignment, as previously described in relation to the operation of the speed responsive valve.

It is to be noted that, when the back of valve 55 is vented and valve 55 seals against gasket 65, the valve 55 is urged open due to the force of the gas on the face of valve 55 until cartridge 13 has burned out. This occurs because the spring 61 is of such strength that it cannot urge the valve 55 to closed position until the pressure of the gases being generated is very low. This operation provides a time delay which permits the cartridge to burn out completely. It is apparent that venting of conduit 59 also occurs since conduit 59 is opened to conduit 51 which connects to passage 16.

From the foregoing, it is apparent that a solid propellant starter having a control for operating pneumatic means for exhausting and blocking gases from the starter turbine in response mechanically to starting speed or pneumatically in response to excess pressure has been provided. The control device for the pneumatic means is compact because common passages are used. It is also apparent that a single control valve 55 is actuated in the event of excess pressure or of excess speed and that this valve provides a time delay for a complete burn out of the solid propellant cartridge.

It is to be understood that persons skilled in the art can make changes in the described embodiment of the invention without departing from the invention as set forth in the appended claims.

What is claimed is:

1. A solid propellant starter for turbine engines comprised of gas generating means for providing turbine-moving gases from a cartridge, a turbine wheel having buckets, housing means for directing gases from said gas means to said buckets, diverting means including a nozzle cut-off plate and a dump valve for diverting gases from said turbine wheel, pneumatic means using gases from said gas generating means arranged to actuate said diverting means to diverting positions, control means for said pneumatic means mechanically responsive to the speed of said turbine and pneumatically responsive to the gas pressure of said gas means and arranged to pass gases from said gas generating means to actuate said pneumatic means when said control means is actuated by a predetermined turbine speed or a predetermined gas pressure, and said control means including a piston-cylinder valve arranged to provide gases to hold said dump valve open and said cut-off plate out of alignment until said cartidge has burned out when a predetermined low pressure will exist in said gas generating means.

2. A solid propellant starter comprised of a turbine, means for generating gases from a solid propellant cartridge, means for directing the gases to the turbine, a nozzle cut-off plate operably arranged to block gases from said turbine, a dump valve operably arranged to exhaust gases being directed to said turbine, pneumatic means for operating said plate to blocking position and said dump valve to exhaust position, control means including a speed valve mechanically responsive to the speed of said turbine and a pressure valve responsive to excess pressure of said means for generating gases, said control means arranged to provide actuating gases to said pneumatic means from said generating means, said control means including a normally-closed control valve, said control valve having a spring-biased piston mounted in a cylinder, the side of said piston being arranged to admit gas to the back thereof from the front of the piston, said cylinder having a side outlet, said speed valve and said pressure valve being arranged to vent said cylinder through said outlet whereby said control valve will be opened by gases from said generating means and said pneumatic means will operate said cut-off plate and said dump valve, said cylinder having a seal in the bottom thereof arranged to seal off the back of said piston so that said control valve will remain open until said spring-biased piston can move against the force of the gas acting on the force of said piston.

3. The combination of a solid propellant starter having a cartridge breech, a turbine, diverting means for diverting gas from said turbine and pneumatic means for operating said diverting means; and a safety control device comprised of a housing having an actuating gas path with a control valve seat therein connected to said breech and said pneumatic means, a control piston cavity in said housing having a cylindrical control piston therein, said piston being biased by a spring to abut said control valve seat and to form a normally-closed control valve, said piston being arranged in said cavity so that gases can pass along the side of the piston to the chamber behind said piston, said housing having a first passage connecting the bottom of said chamber to a first bore which has a speed valve seat and further having a second passage connected to said first bore which has a pressure valve seat, a speed valve member spring-biased against said speed valve seat and directly connected to speed responsive means which is mechanically geared to said turbine so that said speed valve member is moved from said speed valve seat at a predetermined speed of said speed responsive means to form a speed-responsive valve, a pressure valve member spring-biased against said pressure valve seat and arranged to open at a predetermined pressure of gases from said breech to form a pressure-responsive valve, said speed-responsive valve and said pressure-responsive valve having vent means including a common passage downstream of each whereby, when either of said last mentioned valves is opened, said control valve opens and said diverting means is operated, said piston cavity having a seal in the bottom thereof arranged to contact the inner edge of said piston so that, when said control valve chamber is vented, the piston is urged to the bottom of the cavity by gas pressure on the face of the piston until the gas pressure decreases and said spring overcomes the force of the gas pressure on the face of said piston.

4. In combination with a solid propellant starter having a turbine, a gas generator, a piston-operated dump valve, a piston-operated turbine nozzle cut-off plate; the improved safety control device comprised of a housing successively having a small central bore and a large central bore with the shoulder between said bores forming a speed valve seat; a speed-responsive valve assembly extending axially through said bores; said valve assembly successively having a large cylindrical guide part, a reduced cylindrical part, a speed valve member, a vent member and a rod; said valve assembly having its valve member abutting said valve seat and its large cylindrical member gas-tightly contacting the wall of said small central bore so that an annular chamber is formed at said reduced cylindrical part; said housing having first and second passageways connecting into said annular chamber; a third passageway in said housing having a spring-biased piston-type control valve therein which is normally closed until the space behind the piston is vented; said first passageway being connected to said piston space; means connecting said third passageway to said gas generator and to said piston-operated dump valve and said piston-operated turbine nozzle cut-off plate so that said control valve controls said dump valve and said nozzle cut-off plate; said second passageway having a pressure-responsive valve therein which opens at a predetermined high pressure and further having an outlet downstream of the pressure responsive valve which opens into said large central bore; said valve assembly rod being connected to centrifugal governor having a gear which is driven by the starter turbine; said rod being arranged to unseat said speed valve member when said governor exceeds a predetermined speed; said governor and valve assembly being constructed so that said large cylindrical guide part does not obstruct said first passageway when said speed valve is opened; said small central bore being closed by vent means which vent to atmosphere; said valve assembly having a vent passage extending axially through said large cylindrical guide part, said reduced cylindrical part and said valve member and extending out through said vent member whereby, when either said pressure-responsive valve or said speed responsive valve opens, venting through said large central bore and said axial vent passage to said vent means occurs and said control valve opens to actuate said dump valve and said nozzle cut-off plate to divert gases from said turbine by blocking and exhausting.

5. The combnation according to claim 4 and further including the feature that said control valve has its spring-biased piston and a piston end seal arranged so that the end of the piston abuts the seal when the control valve is opened and said control valve does not close until the pressure in said gas generator is at a low level.

6. A solid propellant starter for turbine engines comprised of gas generating means for providing turbine-moving gases from a cartridge, a turbine wheel having buckets, housing means for directing gases from said gas means to said buckets, diverting means arranged to divert gases from said turbine wheel, pneumatic means operable by gases from said gas means arranged to actuate said diverting means to diverting position, control means having a single normally-closed control valve for said pneumatic means, said control means being mechanically responsive to the speed of said turbine and pneumatically responsive to the gas pressure of said gas generating means, said control means and control valve being arranged to pass gases from said gas generating means to operate said pneumatic means when said control means is actuated by a predetermined turbine speed of a predetermined gas pressure whereby gases will be diverted from said turbine wheel at either said speed or said pressure.

7. A cartridge starter comprised of a turbine, cartridge breech means arranged to supply gases to said turbine, diverting means arranged to divert gases from said turbine, pneumatic means arranged to operate said diverting means to diverting position, a control device for supplying actuating gas to said pneumatic means from said breech means, said control device being operable in response to the speed of said turbine and arranged to supply said actuating gas until the pressure in said breech means drops to a predetermined low level when a cartridge in said breech means will be burned out, said control device having a normally-closed spring-biased piston valve for controlling said actuating gas, said piston valve being arranged to have the actuating gas admitted to the back of said valve, said control device having turbine-speed-responsive means arranged to vent the back of said piston valve whereby said valve is opened, and said piston valve having means to seal the back of said valve so that the actuating gas is not admitted to the back when said piston valve is opened.

References Cited in the file of this patent
UNITED STATES PATENTS

| | | |
|---|---|---|
| 1,816,787 | Moss | July 28, 1931 |
| 2,154,572 | Lansing | Apr. 18, 1939 |
| 2,559,006 | Clapham | July 3, 1951 |
| 2,620,627 | Nardone | Dec. 9, 1952 |
| 2,631,426 | Jewett | Mar. 17, 1953 |
| 2,651,493 | Volk | Sept. 8, 1953 |
| 2,754,657 | Ehorn | July 17, 1956 |
| 2,889,117 | Wimpress | June 2, 1959 |